Jan. 14, 1936.   R. V. RIDEOUT   2,027,551
AUTOMOBILE DRESSING BEACH TENT
Filed April 20, 1935   4 Sheets-Sheet 2
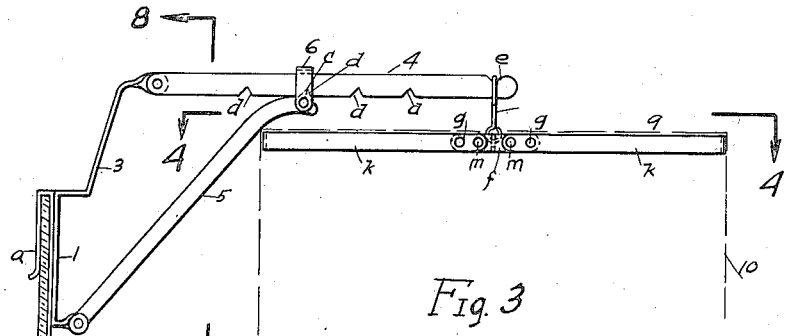
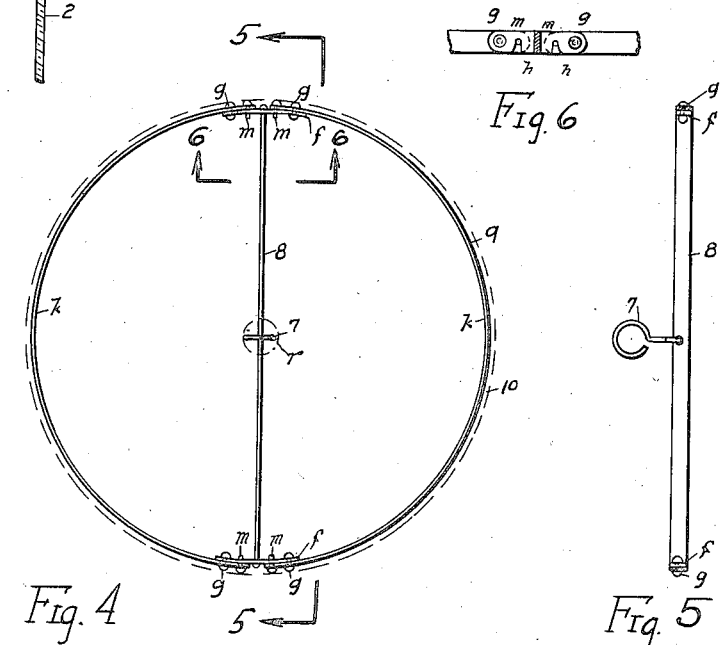
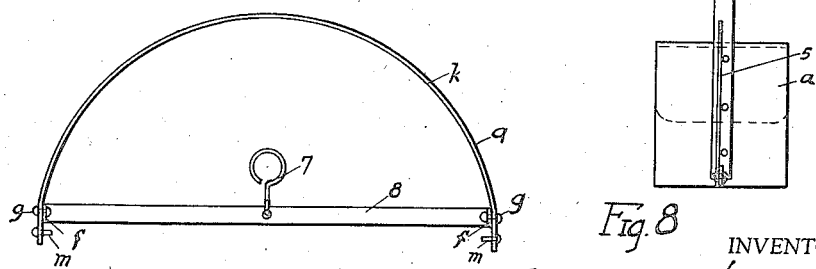
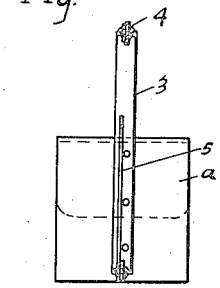
INVENTOR.
Raymond V. Rideout
BY Myron J. Dikeman
ATTORNEY.

Jan. 14, 1936.    R. V. RIDEOUT    2,027,551
AUTOMOBILE DRESSING BEACH TENT
Filed April 20, 1935    4 Sheets-Sheet 3

INVENTOR.
Raymond V. Rideout
BY Myron J. Dikeman
ATTORNEY.

Jan. 14, 1936.　　　　R. V. RIDEOUT　　　　2,027,551
AUTOMOBILE DRESSING BEACH TENT
Filed April 20, 1935　　　4 Sheets-Sheet 4
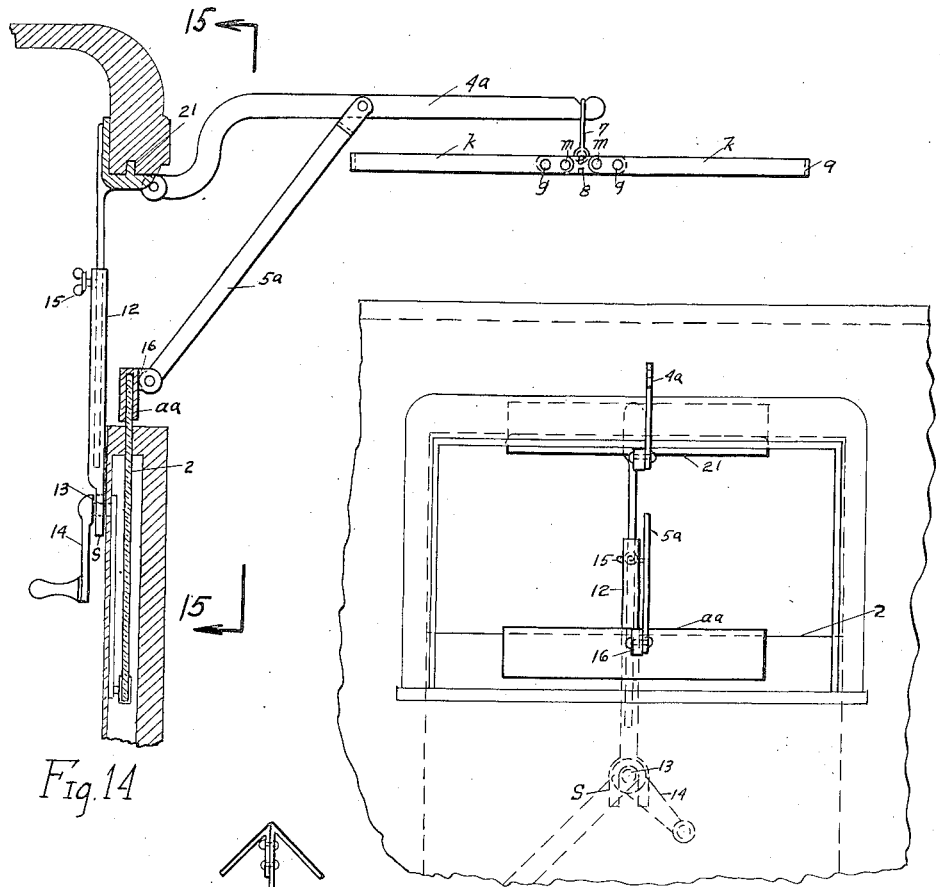
Fig. 14
Fig. 15
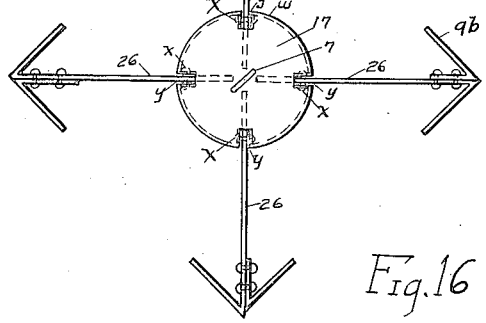
Fig. 16
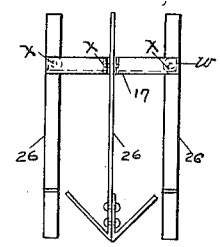
Fig. 18
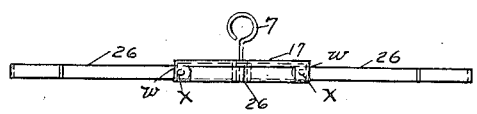
Fig. 17
INVENTOR.
Raymond V. Rideout
BY
Myron J. Dikeman
ATTORNEY.

Patented Jan. 14, 1936

2,027,551

UNITED STATES PATENT OFFICE 2,027,551

AUTOMOBILE DRESSING BEACH TENT

Raymond V. Rideout, Highland Park, Mich.

Application April 20, 1935, Serial No. 17,547

8 Claims. (Cl. 135—8)

The object of my invention is to provide a collapsible dressing bag, or small tent, adapted for use of bathers on the open beach for making clothing changes.

Another object is to produce a beach dressing tent that can be readily attached to an automobile side without cutting, marring or providing special connecting means.

A further object is to produce a beach dressing tent that is collapsible and can be folded into a very small space for conveniently carrying in an automobile.

A still further object is to provide a small beach dressing tent that is simple in construction, easily and efficiently operated and that can be manufactured at a very low cost.

These several objects are attained in the preferred form by the construction and arrangement of parts more fully hereinafter set forth.

Similar parts on all drawings are marked by similar numerals or letters.

Fig. 3 is a side view in detail of the tent supporting frame showing the means for attaching same to an automobile window pane, and the adjustable means mounted thereon.

Fig. 4 is a plan view of the tent bag support frame showing the folding means for collapsing the frame when not in use.

Fig. 5 is a sectional view taken on the line 5—5 of the Fig. 4, showing the supporting means with cross bar and end hinge connections.

Fig. 6 is a sectional view taken on the line 6—6 of Fig. 4 showing the special hinge and rim locking means.

Fig. 7 is a side view of the same tent bag frame when folded together ready for packing.

Fig. 8 is a sectional view taken on the line 8—8 of the Fig. 3 showing the connecting means for attaching the supporting frame to the automobile window pane.

Fig. 14 is a side view of an alternate form of tent supporting frame members showing adjustable means for the tent supporting bar.

Fig. 15 is a sectional view taken on the line 15—15 of Fig. 14 showing the special window connections and means for adjusting same.

Fig. 16 is a plan view of an alternate form of tent bag support frame, formed with separated tent support arms.

Fig. 17 is a side view of the support frame shown in Fig. 16 showing the pivot means for attaching the arms to the central frame section.

Fig. 18 is a side view of the same frame when the arms are folded together.

Figure 1:
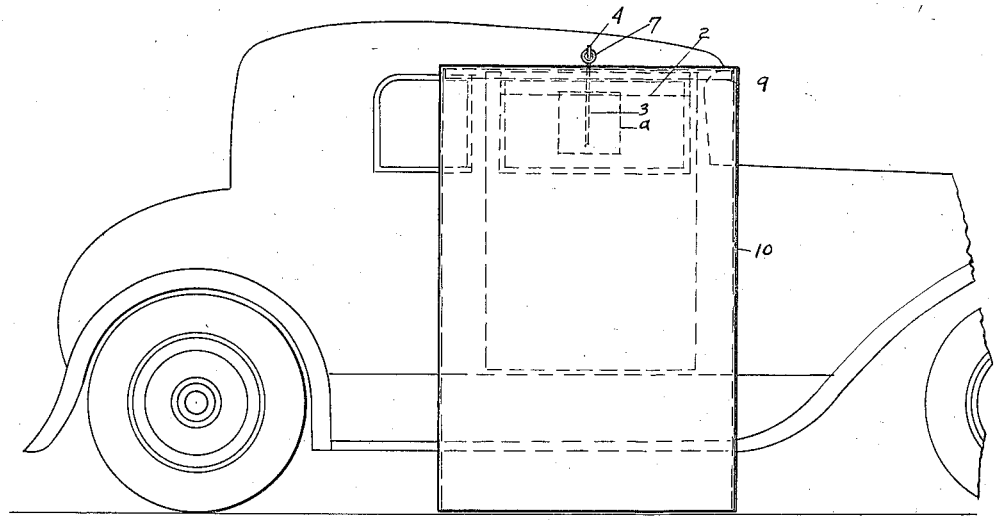
Fig. 1 is a side view of the dressing tent as attached to the side of an automobile.

In general, my automobile dressing beach tent comprises a supporting frame structure suitable for slipping over the top edge of an automobile window glass pane, and provided with a side support arm projected from one side thereof, suitable for carrying on the outer end thereof a light metal frame for supporting a loosely fitted bag tent. The bag tent being of a size to allow a person to conveniently dress therein, the tent extending to the ground and providing a complete inclosure.

I will now describe more fully the detailed construction of my device referring to the drawings and the marks thereon.

My preferred frame structure is shown in the Figs. 3 to 8 inclusively.

Figure 2:
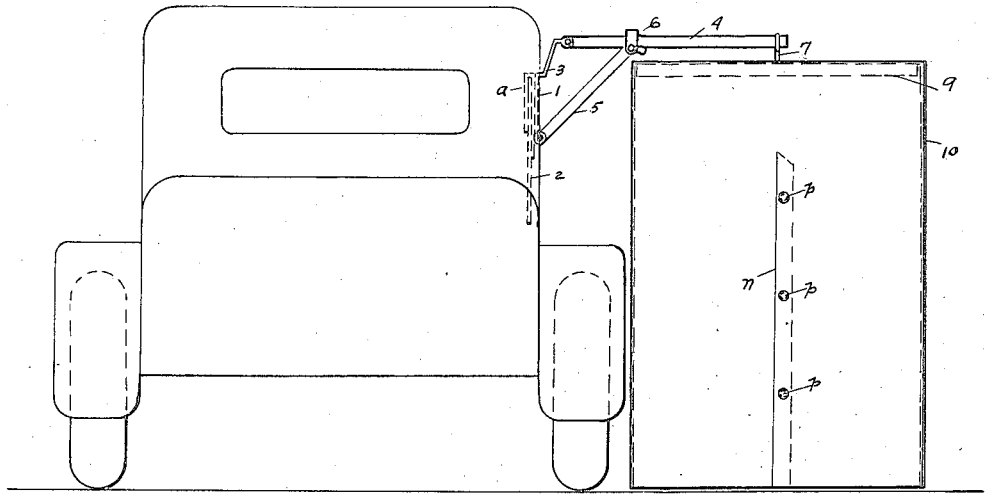
Fig. 2 is a rear view of an automobile with the dressing tent attached, showing the relative position of the tent and supporting means.

The window support frame 1 is preferably made of a folded sheet of light thin metal, forming a window hook plate $a$, designed to fit over and engage the top edge of an automobile window pane 2 when the window is lowered in the automobile body window frame as illustrated in Figs. 1 to 3 of the drawings. The outer side of the folded window hook plate $a$ is extended downward to provide an enlarged bearing surface against the window, and carries fixedly mounted thereon a frame bar 3 formed with extended hinge ends and placed in a vertical position when mounted on the automobile window pane, said bar 3 being bent and formed to clear the walls of the automobile top. Mounted on the upper end of the frame bar 3 is a tent support arm 4, pivotally connected thereto so as to swing in a vertical plane. Mounted on the lower end hinge of the frame bar 3 is an adjustable brace bar 5, also pivotally connected thereto so as to swing in a vertical plane with the bar 4, said brace bar 5 being provided with a tooth shaped outer end c designed to engage and fit the various bar notches d of the support arm 4, for retaining said support arm in various chosen elevated positions. A small lock loop 6 is pivotally attached to the outer toothed end of the brace bar 5 and encircled about the support arm 4 for retaining said toothed brace bar end in contact therewith for all positions of said bar, and for locking the brace bar end within the respective notches. The outer end of the support bar 4 is provided with a notch recess e for receiving and retaining a tent support hook 7 thereon, said hook 7 being attached to a central cross bar 8 of a tent frame 9. The cross bar 8 is preferably a straight metal bar of light material, formed with T-ends f thereon, each arm of said T-ends being provided with a hinge g and a lock slot h. The semi-circular rim sections k of the tent frame 9 are hingedly attached to the said cross bar T-ends through the hinge joints g, the ends of each frame section k being extended beyond the hinges k and are provided with stop pins m positioned therein to engage their respective lock slots h of the cross bar 8 when said sections k are folded thereon, and which retains said frame sections in a rigid extended position, suitable for receiving the tent bag thereon.

The tent bag 10 is made of any suitable opaque cloth material, designed to fit over the frame 9 and provided with an open bottom end. The tent bag 10 is preferably formed with a side slit n for more conveniently entering and leaving the dressing tent. Suitable fasteners p may be attached to the tent slit edges for conveniently attaching same together when the tent is occupied. The tent bag 10 is simply slipped over the circular support frame 9, and the frame support hook 7 attached to the end of the arm 4, the same being extended through the tent opening r formed in the top thereof. When the tent is not in use the bag 10 may be easily removed therefrom for folding and packing, or it may be folded together with the frame section.

For erecting my automobile dressing tent, one side window of the automobile is first slightly lowered as indicated in Fig. 1 of the drawings, and the window hook plate a fitted over the top edge of the window glass, and the connected support arm 4 adjusted in approximately a horizontal position by means of the connected brace bar 5. The tent bag 10 is then adjusted over the support frame 9 and hung on the outer end of the arm 5 by means of the attaching hook 7. The arm 4 is then adjusted vertically by moving the connected brace 5 thereunder, until the tent bag 10 just contacts the ground. The dressing tent is then ready for use.

Figure 9:
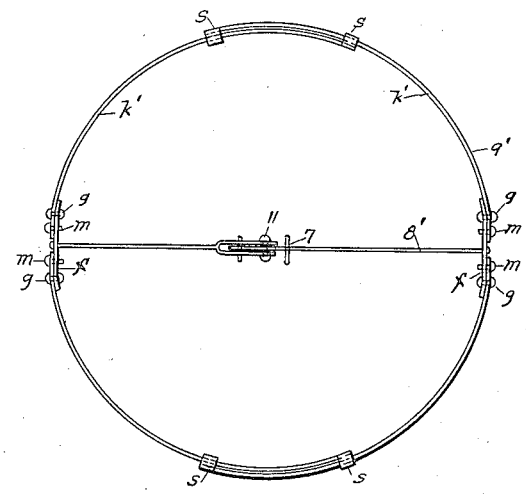
Fig. 9 is a plan view of a modified form of tent bag frame showing means for collapsing the frame in two directions for packing same in a smaller space.
Figure 10:
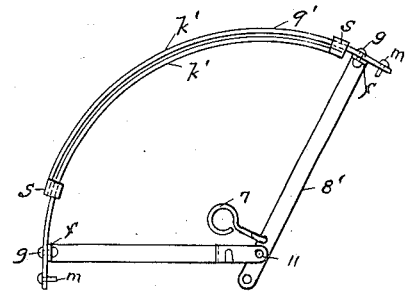
Fig. 10 is a side view of the collapsible frame shown in Fig. 9 when folded completely together.

A modified form of support frame 9' is illustrated in the Figs. 9 and 10 of the drawings, where the cross bar 8' is provided with a central hinge joint 11, similar in structure to the T-end joints of said cross bar, and the rim sections k' are made in jointed slidable sections by the connecting end loops s. By these additional joints the frame 9' can be first folded together sidewise as previously illustrated in Fig. 7, and then collapsed edgewise as shown in Fig. 10, thus reducing the frame section to a much smaller space. When unfolded, the frame 9' is exactly the same as heretofore described, and operates in the same manner as the frame 9 shown in the Fig. 4.

Figure 11:
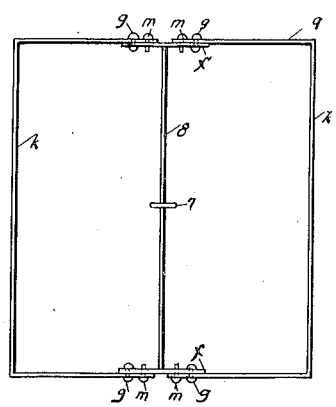
Fig. 11 is a further modified form of tent frame which may be used to provide a rectangular shaped tent.

The Fig. 11 shows a similar tent frame as illustrated in Fig. 5 except it is provided with a rectangular tent supporting rim. Its operation is the same as in the previous case. Any shape or design of the frame exterior may be used equally as well, and with the tent bag made accordingly.

Figure 12:
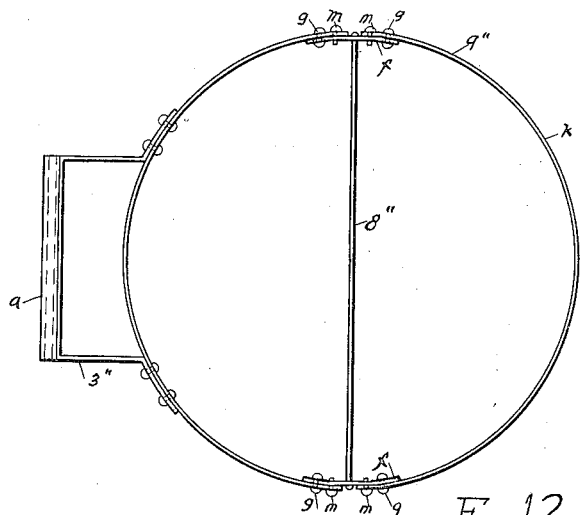
Fig. 12 is a further modified form of supporting frame when the tent ring is rigidly attached to the window yoke.
Figure 13:
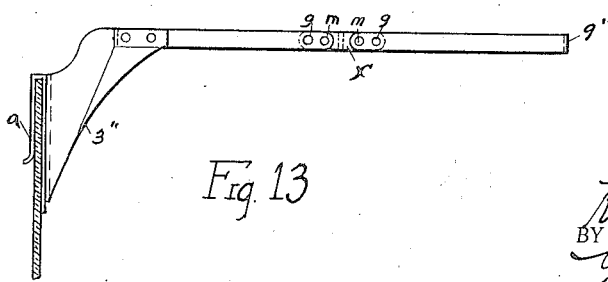
Fig. 13 is a side view of the frame shown in Fig. 12 showing the means for rigidly connecting the frame section thereto.

A further modification is shown in Figs. 12 and 13 of the drawings, where the original support arm 4 is omitted and the edge of the tent frame ring 9'' is rigidly connected to the window hook plate a by the rigid brace bar 3'' being rigidly attached thereto. The operation is the same as in the former case.

Figs. 14 and 15 show an alternate form of frame support for the tent bag, provided with adjustable means for raising and lowering the support arm 4a by raising or lowering the connected window pane, through the connected brace arm 5a pivotally attached therebetween. The support arm 4a is pivotally connected to a metal groove plate 21, designed to fit and engage the upper window pane groove recess of the automobile body side window, when the pane 2 is lowered therein, and is rigidly retained and supported in said groove recess by an adjustable support bar 12 extended therefrom to engage the bearing 13 of the automobile window operating handle 14, by the forked end s formed on the rod end. When the rod 12 is properly adjusted and clamped by the thumb screw 15, the groove plate 21 is rigidly held in place. A special window hook plate aa is provided for hooking over the top edge of the window pane 2 as in the former case, but is provided with a side bearing 16 fixedly mounted thereon. The brace bar 5a is pivotally connected thereto and also has its opposite end pivotally connected to the support arm 4a. When the frame is properly mounted in the automobile body window opening, and the brace rods rigidly adjusted, the support arm 4a may be readily adjusted to any desired vertical position by merely raising or lowering the window pane 2. The operation for the dressing tent is the same as heretofore described in the former case.

A further alternate form of tent frame 9b is shown in the Figs. 16 to 18 inclusive, whereby individual tent support arms 26 are each pivotally attached to a central hinge plate 17, said hinge plate being formed with an outer rim w having rim pivot bearings x and arm notches y, all suitable for retaining the support arms 26 therein when the inner ends thereof are folded beneath the said hinge plate 17 as illustrated in the drawings. The support arms 26 may be readily folded together by raising the outer ends through the plate arm notches y as illustrated in the Fig. 18. When unfolded and attached to the support arm 4, the operation is the same as in the former case.

It is apparent that my invention is subject to various modifications in both structure and design and I claim the dressing tent as herein illustrated and any modification thereof that is substantially a substitution of parts therein shown.

Having fully described my automobile dressing beach tent, what I claim as my invention and desire to secure by Letters Patent is;

I claim:

1. A dressing tent to be used with an automobile, comprising a window engaging frame, a tent support frame positioned at one side of said window engaging frame, rigidly connected thereto and supported thereby, said tent supporting frame being adapted to support a tent inclosure.

2. A dressing tent adapted for use with an automobile, comprising a window engaging frame suitable for rigidly attaching to the window members of an automobile body, a support arm projected from one side of said window engaging frame, connected thereto and supported thereby, a tent support frame attached to said support arm, said support frame being adapted to support a tent inclosure.

3. A dressing tent adapted for use with an automobile, comprising a window engaging frame section for rigidly attaching to the window members of an automobile body, a support arm projected from one side of said window engaging frame and pivotally connected thereto, adjustable brace means connected between the said window engaging frame and the support arm for adjusting the position of said support arm and supporting same, a tent support frame attached to said support arm and supported thereby, said tent support frame being adapted to support a tent inclosure.

4. A dressing tent adapted for use with an automobile, comprising a window engaging hook shaped member suitable for rigidly attaching to the top edge of an automobile window pane and supported thereby, a support arm pivotally connected to said window engaging member and projected to one side thereof, said support arm being formed with adjusting notches along one edge thereof, a brace member pivotally attached to the window engaging hook shaped member and extended to engage the adjusting notches of the said support arm, means mounted on said brace member for retaining same in contact with the support arm edge and adjusting notches for all positions of the arm, a collapsible tent support frame attached to the end of said support arm, said support frame being adapted to support a tent inclosure.

5. A dressing tent adapted for use with an automobile, comprising a window groove plate having means for rigidly attaching same to the window pane grooves of an automobile body, a support arm pivotally attached to said groove plate and projected to one side thereof, a hook member for engaging the top edge of an automobile body window pane, a brace member pivotally connected between said window pane hook member and the extended support arm capable of adjusting the position of said support arm in a vertical plane as the automobile window pane is raised or lowered, a collapsible tent support frame attached to the outer end of said support arm and supported thereby, said tent support frame being adapted to support a tent inclosure.

6. A collapsible tent support frame adapted for an automobile dressing tent to be used with an automobile and side window support frame, comprising a cross-bar formed with a double hinge member on each end thereof, bent side frame sections pivotally attached to opposite sides of said cross-bar by the respective end hinge members, and in a manner to allow said frame sections to unfold in the same horizontal plane and form a rigid frame section when unfolded, and support attaching means mounted on said cross-bar.

7. A collapsible tent support frame adapted for an automobile dressing tent to be used with an automobile and projected window support frame, comprising a cross-bar hinged at the center and formed with a double hinge member at each end thereof, curved side frames formed of jointed slidable sections pivotally attached to opposite sides of the said cross-bar through their respective end hinge members and in a manner to unfold the various hinge joints and sections in the same horizontal plane forming a rigid frame section when completely unfolded, and an attached support hook mounted on said cross bar.

8. A collapsible tent support frame adapted for an automobile dressing tent to be used with an automobile and projected window side support frame, comprising a central hinge support section, tent support arms pivotally attached thereto and extended radially therefrom, and a support hook mounted near the center of the hinge support section for attaching same to the automobile window side support frame.

RAYMOND V. RIDEOUT.